United States Patent
Chen et al.

(10) Patent No.: US 12,013,897 B2
(45) Date of Patent: Jun. 18, 2024

(54) SYSTEMS AND METHODS FOR GENERAL-PURPOSE OUT-OF-CORE RANDOM WALK GRAPH COMPUTING

(71) Applicant: Tsinghua University, Beijing (CN)

(72) Inventors: Kang Chen, Beijing (CN); Yongwei Wu, Beijing (CN); Jinlei Jiang, Beijing (CN); Shuke Wang, Beijing (CN); Shaonan Ma, Beijing (CN); Ke Yang, Beijing (CN); Mingxing Zhang, Beijing (CN)

(73) Assignee: Tsinghua University, Beijing (CN)

( * ) Notice: Subject to any disclaimer, the term of this patent is extended or adjusted under 35 U.S.C. 154(b) by 181 days.

(21) Appl. No.: 17/902,200

(22) Filed: Sep. 2, 2022

(65) Prior Publication Data
US 2024/0078260 A1  Mar. 7, 2024

(51) Int. Cl.
G06F 16/90  (2019.01)
G06F 9/54  (2006.01)
G06F 15/78  (2006.01)
G06F 16/901  (2019.01)

(52) U.S. Cl.
CPC .......... *G06F 16/9024* (2019.01); *G06F 9/54* (2013.01); *G06F 15/78* (2013.01)

(58) Field of Classification Search
CPC ......... G06F 16/9024; G06F 9/54; G06F 15/78
USPC ....................................................... 707/798
See application file for complete search history.

(56) References Cited

U.S. PATENT DOCUMENTS

| | | | |
|---|---|---|---|
| 6,597,363 B1* | 7/2003 | Duluk, Jr. | G06T 15/50 345/506 |
| 7,788,254 B2* | 8/2010 | Burges | G06F 16/958 707/798 |
| 7,949,661 B2* | 5/2011 | Andersen | G06F 16/954 707/738 |
| 8,903,824 B2* | 12/2014 | Akoglu | G06F 16/2246 707/798 |
| 9,129,038 B2* | 9/2015 | Begel | G06F 8/74 |
| 10,956,521 B1* | 3/2021 | Yu | G06F 16/9535 |
| 11,334,567 B2* | 5/2022 | Ziauddin | G06F 16/9024 |
| 11,468,069 B1* | 10/2022 | Sharma | G06F 16/2457 |
| 2002/0171665 A1* | 11/2002 | Ramani | G06T 15/00 345/611 |
| 2003/0174133 A1* | 9/2003 | Shehane | G06T 11/40 345/420 |
| 2007/0239694 A1* | 10/2007 | Singh | G06F 16/9024 |
| 2010/0121792 A1* | 5/2010 | Yang | G06F 16/9024 708/441 |

(Continued)

*Primary Examiner* — Hanh B Thai
(74) *Attorney, Agent, or Firm* — IPro, PLLC

(57) ABSTRACT

Systems and methods are provided for performing random walk graph computing. One method may comprise generating a subset of walkers on a graph, maintaining the generated subset of walkers in a walker pool in a memory, loading a coarse-grained block of the graph from a non-volatile storage into a block buffer of the memory, generating pre-sampled edges for vertices in the coarse-grained block, storing the pre-sampled edges into a pre-sampled edge buffer allocated for the coarse-grained block and moving one or more walkers of the generated subset of walkers using the pre-sampled edges stored in the pre-sampled edge buffer. The generated subset of walkers may have an initial number determined based on a memory space allocated to the walker pool.

20 Claims, 5 Drawing Sheets

(56) References Cited

U.S. PATENT DOCUMENTS

| | | | | |
|---|---|---|---|---|
| 2010/0185649 A1* | 7/2010 | Zhou | | G06F 16/9024 |
| | | | | 707/769 |
| 2011/0173189 A1* | 7/2011 | Singh | | G06F 16/9024 |
| | | | | 707/722 |
| 2013/0151536 A1* | 6/2013 | Akoglu | | G06F 16/2246 |
| | | | | 707/E17.084 |
| 2015/0317376 A1* | 11/2015 | Bauer | | G06F 16/285 |
| | | | | 707/737 |
| 2017/0085275 A1* | 3/2017 | Glover | | G06F 17/10 |
| 2017/0091319 A1* | 3/2017 | Legrand | | G06F 16/93 |
| 2017/0249340 A1* | 8/2017 | Okuda | | G06V 20/30 |
| 2018/0024989 A1* | 1/2018 | Bharti | | H04N 21/8405 |
| | | | | 704/9 |
| 2018/0137155 A1* | 5/2018 | Majumdar | | G06N 10/00 |
| 2018/0336437 A1* | 11/2018 | Cheng | | G06F 18/2433 |
| 2019/0251480 A1* | 8/2019 | Garcia Duran | | G06N 20/20 |
| 2020/0035002 A1* | 1/2020 | Epasto | | G06T 9/00 |
| 2020/0285944 A1* | 9/2020 | Lee | | G06F 16/9024 |
| 2020/0293517 A1* | 9/2020 | Gerken | | G06F 18/22 |
| 2021/0019325 A1* | 1/2021 | Edge | | G06F 16/254 |
| 2021/0019558 A1* | 1/2021 | Edge | | G06F 18/2323 |
| 2021/0049171 A1* | 2/2021 | Ziauddin | | G06F 16/9024 |
| 2021/0049209 A1* | 2/2021 | Shi | | G06N 20/00 |
| 2021/0073282 A1* | 3/2021 | Hunter | | G06F 8/33 |
| 2021/0279279 A1* | 9/2021 | Appel | | G06F 18/213 |
| 2022/0004366 A1* | 1/2022 | Ghosh | | G06F 8/71 |
| 2022/0075948 A1* | 3/2022 | Yuan | | G06N 20/00 |
| 2022/0100800 A1* | 3/2022 | Georgopoulos | | G06N 20/00 |
| 2022/0114456 A1* | 4/2022 | Nouri | | G06F 18/214 |
| 2022/0198471 A1* | 6/2022 | Silva | | G06F 16/9024 |
| 2022/0292305 A1* | 9/2022 | Rothschild | | G06F 18/2323 |
| 2023/0016113 A1* | 1/2023 | Canim | | G06F 21/6227 |
| 2023/0239306 A1* | 7/2023 | Hayrapetyan | | H04L 41/12 |
| | | | | 726/1 |

* cited by examiner

SYSTEMS AND METHODS FOR GENERAL-PURPOSE OUT-OF-CORE RANDOM WALK GRAPH COMPUTING

TECHNICAL FIELD

The disclosure herein relates to graph computing, particularly relates to out-of-core random walk computing.

BACKGROUND

Graph computing is widely used in a large number of applications. Random walk is currently one of the most important and effective analysis tools as a building block for graph computing. For example, random walk serves as the foundation for node ranking (e.g., web page ranking for searches), node embedding, and graph mining. But the size of graphs (e.g., number of vertices and number of edges) and the size of walkers are huge in various applications. With the price of memory remains relatively expensive, it is impractical to hold all data in memory for random walk computing. In contrast, the price of Solid State Drive (SSD) has fallen substantially in the last few years, and SSD's read bandwidth has increased to gigabytes per second. This makes it attractive to build out-of-core random walk computing systems that iteratively load only a necessary part of the graph into memory for the current analysis epoch.

In the iteration-based approach, in order to make best use of sequential disk I/O, the computing systems partition the graph into pre-defined blocks at the beginning, and then either fully or selectively load the blocks into memory in each iteration. This block-centric design leads to graph-oriented scheduling. In contrast to other graph computing tasks, in random walk applications, the walkers (the computation states) generally are distributed unevenly among the vertices. Even worse, the walkers jump to other vertices after each step, which leads to dynamic distribution through the computation. In this case, a pre-defined 1D/2D graph partition and the corresponding graph-oriented scheduling frequently mismatch with the hot region of walkers. As a result, existing random walk graph computing systems frequently stall to wait for graph data to be loaded, which harms the performance.

The state-of-the-art out-of-core random walk system tries to mitigate the stalling effect by (1) prioritizing the loading order of blocks so that blocks with more walkers (the hotter blocks) are loaded earlier and (2) taking advantage of a re-entry mechanism for allowing walkers to jump more than one step in each epoch. However, because the current block is only a small part of the large graph, the walkers tend to jump out of it after making movement. Even though the current hottest block has been loaded into memory, this block will cool down very quickly after few steps, and the system will soon need to wait for another disk I/O to refill the memory. In other words, more disk loading is needed for moving the walkers.

Accordingly, there is a need for an out-of-core random walk computing system and method with improved disk I/O utilization and performance.

SUMMARY

The present disclosure provides systems and methods for out-of-core random walk computing that has a decoupled architecture that decouples sampling from moving walkers. The decoupled architecture enables walker oriented scheduling. Embodiments according to the present disclosure may adaptively generate walkers and flexibly adjust the distribution of reserved sampling results in memory. The design is centered on keeping walkers always moving. In other words, besides trying to load graph data more and faster, embodiments also try to make sure that there are always enough data in memory for a number of walkers also in memory to move forward.

In an exemplary embodiment, there is provided a method that may comprise: generating a subset of walkers on a graph for a random walk computing task, maintaining the generated subset of walkers in a walker pool in a memory, loading a coarse-grained block of the graph from a non-volatile storage into a block buffer of the memory, generating pre-sampled edges for vertices in the coarse-grained block that may include generating a pre-configured certain number of pre-sampled edges for each vertex in the coarse-grained block, storing the pre-sampled edges for vertices in the coarse-grained block into a pre-sampled edge buffer allocated for the coarse-grained block and moving one or more walkers of the generated subset of walkers using the pre-sampled edges stored in the pre-sampled edge buffer. The subset of walkers may be a portion of a full set of walkers on the graph and the generated subset of walkers may have an initial number determined based on a memory space allocated to the walker pool.

In another exemplary embodiment, there is provided a computing system that may comprise a main memory for storing software instructions for performing random walk graph computing and a central processing unit (CPU) coupled to the main memory and configured to execute the software instructions to: generate a subset of walkers on a graph for a random walk computing task, maintain the generated subset of walkers in a walker pool in a memory, load a coarse-grained block of the graph from a non-volatile storage into a block buffer of the memory, generate pre-sampled edges for vertices in the coarse-grained block that may include generating a pre-configured certain number of pre-sampled edges for each vertex in the coarse-grained block, store the pre-sampled edges for vertices in the coarse-grained block into a pre-sampled edge buffer allocated for the coarse-grained block and move one or more walkers of the generated subset of walkers using the pre-sampled edges stored in the pre-sampled edge buffer. The subset of walkers may be a portion of a full set of walkers on the graph. The generated subset of walkers may have an initial number determined based on a memory space allocated to the walker pool.

In yet another exemplary embodiment, there is provided one or more computer-readable non-transitory media comprising one or more software instructions that when executed by one or more processors are to configure the one or more processors to cause performance of random walk graph computing operations comprising: generating a subset of walkers on a graph for a random walk computing task, the subset of walkers being a portion of a full set of walkers on the graph; maintaining the generated subset of walkers in a walker pool in a memory, the generated subset of walkers having an initial number determined based on a memory space allocated to the walker pool; loading a coarse-grained block of the graph from a non-volatile storage into a block buffer of the memory; generating pre-sampled edges for vertices in the coarse-grained block, including generating a pre-configured certain number of pre-sampled edges for each vertex in the coarse-grained block; storing the pre-sampled edges for vertices in the coarse-grained block into a pre-sampled edge buffer allocated for the coarse-grained block; and moving one or more walkers of the generated subset of walkers using the pre-sampled edges stored in the pre-sampled edge buffer.

DETAILED DESCRIPTION

Figure 1:
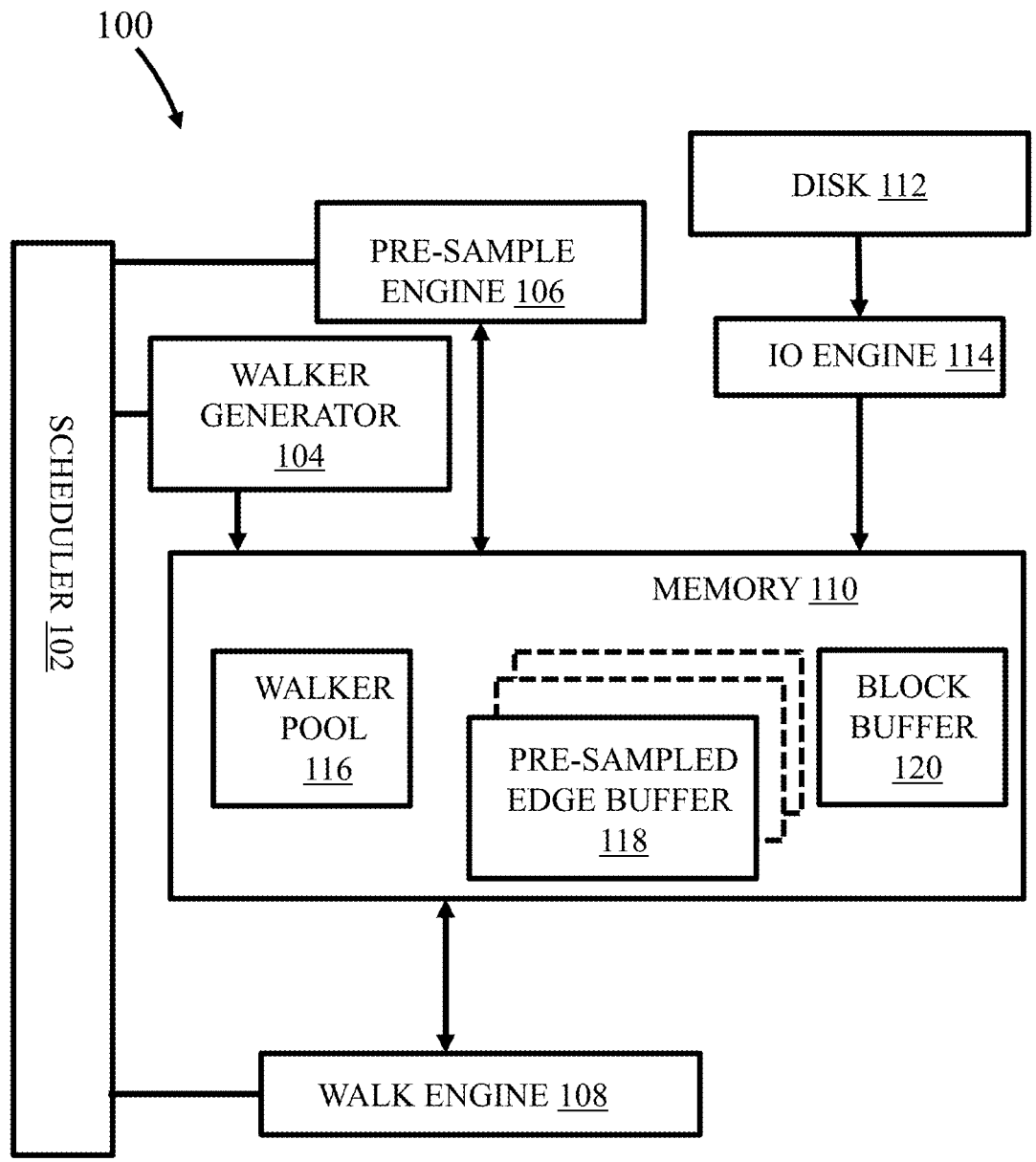
FIG. 1 schematically shows an out-of-core random walk computing system in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for out-of-core random walk graph computing. FIG. 1 schematically shows a computing system 100 according to an embodiment. The computing system 100 may comprise a scheduler 102, a walker generator 104, a pre-sample engine 106, and a walk engine 108. In some embodiments, these components may be implemented in software and executed by a computer processor. Data for out-of-core random walk graph computing may be stored in a disk 112 (e.g., a non-volatile storage device such as an SSD) and loaded by an Input/Output (IO) engine 114 into a memory 110 when the computing system 100 is in execution. The memory 110 may include a walker pool 116, one or more pre-sampled edge buffers 118 and a block buffer 120 during operation of the computing system 100. Graph data loaded by the IO engine 114 from the disk 112 may be stored in the block buffer 120. The walk pool 116 may store one or more walkers generated by the walker generator 104. The one or more pre-sampled edge buffers 118 may store pre-sampled edges generated by the pre-sample engine 106.

The scheduler 102 may schedule allocation of CPU resources. For example, the scheduler 102 may schedule the order of execution of the walker generator 104, the pre-sample engine 106 and walk engine 108. In addition, the scheduler 102 may allocate threads for background execution, such as, but limited to, one or more background threads to load graph data from the disk 112 into the memory 110.

The walker generator 104 may be configured to generate walkers. In a random walk computing task, a total number of N walkers may need to be generated, in which N may be a very large positive integer. Each walker may be generated by the walker generator 104 and stored in the walker pool 116 of the memory 110. In contrast to conventional out-of-core random walk systems that generate all walkers at the beginning and then hold them all in memory (limits its scalability) or swap between memory and disks (leads to high overhead), the walker generator 104 may generate only a subset of walkers that can be held in memory at any time. The subset of walkers may be a portion of the full set of walkers on the graph of the random walk computing task. When one or more previously generated walkers are terminated, there will be free memory and the walker generator 104 may generate more walkers. The initial number for the subset of walkers to be generated may depend on the initially allocated memory space of the walker pool 116.

A graph may have many vertices and edges connecting pairs of vertices. Each walker may start from a vertex, either as a starting point or in the process of random walking, and randomly walk (or move) to another vertex via an edge between the pair of vertices. Selection of the edge for the movement may be referred to as sampling. The computing system 100 may decouple the edge sampling from the walker movement. That is, edge sampling may be performed independently from walker movements. For example, a pre-sampled edge buffer 118 may be allocated in the memory 110 for each loaded graph block, respectively. For each vertex of a loaded graph block, one or more edges may be sampled and stored in the pre-sampled edge buffer 118 allocated for this graph block before any walker making any movements on this graph block. Therefore, instead of directly caching a large number of edge blocks, which has limited help for random walk and wastes the precious memory, the computing system 100 may pre-sample edges from the blocks loaded into the block buffer 120 and store the pre-sampled edges in their respective pre-sampled edge buffer 118.

The pre-sample engine 106 may be configured to generate pre-sampled edges from a graph block in the block buffer 120 and store the generated pre-sampled edges in the pre-sampled edge buffer 118 allocated for this graph block. For example, when a graph block containing one or more vertices is loaded into the memory 112, an initial number of edges may be sampled for each vertex in the loaded block based on a sampling rule. The initial number may be a pre-configured number based on the size of the memory 110. For example, if the size of the memory 110 is not large, the initial number may be set as 4. In some embodiments, because each vertex may have a different frequency of being visited, the computing system 100 may adaptively generate different numbers of pre-sampled edges for different vertices according to visit frequencies. For example, a vertex that is visited more often may need more pre-sampled edges for walker(s) to keep moving while another vertex that is visited less often may need less pre-sampled edges. The frequency of each vertex being visited may be collected after the computing system 100 has started a computing task.

The sampling rule may be determined according to the random walk computing task. In one example, for a random walk computing task that the edges may be weighted, each edge may have a possibility of to be sampled equal to (the edge's weight)/(total weights of all edges of the vertex). In another example, for a random walk computing task that the edge may be un-weighted, each edge may have a possibility of to be sampled equal to 1/(total number of edges of the vertex). The possibility of an edge being sampled may determine the rate of being selected for the edge. For example, a 10% possibility may mean that this edge may be sampled once in every 10 sample results and it may occur randomly (e.g., based on the kind of random selection operation of the sampling technique implemented). It should be noted that the sampling technique implemented by the pre-sample engine 106 may be any known or yet to be developed sampling technique.

The walk engine 108 may pick a walker from the walker pool 116 and move from a current vertex to a next vertex using one sampled edge stored in the pre-sampled edge buffer 118. For example, the pre-sampled edge buffer 118 allocated to one graph block may store one or more pre-sampled edges for a vertex in the graph block, the walk engine 108 may pick a walker from the walker pool 116 and determine that the walker's current position is at this vertex and choose the next available pre-sampled edge stored in the pre-sampled edge buffer 118 to move the walker.

In some embodiments, the computing system 100 may pre-samples edges as many as possible (e.g., limited only by allocated memory space), thus it can keep walkers moving by using the pre-sampled edges even when the block is evicted. This approach may provide two advantages: 1) the size of pre-sampled edges is much smaller than then original outgoing edge set of the vertex; 2) the number of buffered pre-sampling results for each vertex is not limited by block partitioning. This second advantage is also very important because the conventional random walk computing systems are block based. But the distribution of hot vertices (e.g., vertices visited more often) is not limited by block partitioning. With a good forecasting of which vertex will be visited later (e.g., based on frequency of visits), in some embodiments, the pre-sample engine 106 may pre-sample more than one edge for the hot vertices of a graph block based on frequency of visits and store the results in the pre-sampled edge buffer 118 allocated for the graph block for future usages. These sampling results may provide extra cushion for moving walkers and help avoid loading a whole edge block again where only a few active walkers stay.

Because not all N walkers are generated at the beginning, the order of walker generation may help the I/O utilization and performance. In some embodiments, the scheduler 102 may first schedule the walker generator 104 to generate as many walkers as possible if there is any free memory. This may help increase the initial density of walkers which will lead to high efficiency. After one or more walkers on a graph block are terminated, instead of increasing the size of the pre-sampled edge buffer 118 allocated to the graph block or moving other walkers, the scheduler 102 may schedule the walker generator 104 to generate new walkers if there are still not yet generated walker(s). This may allow for faster consumption of the edges in the pre-sampled edge buffer 118. In this way, the pre-sample engine 106 may pre-sample more edges to refill the consumed edges and the computing system 100 may increase the I/O utilization, and it increases the possibility that there may be always one or more walkers that can be moved.

In at least one embodiment, the scheduler 102 may implement a scheduling process embodied in pseudo code for a Schedule function as follows.

| 1 | Function Schedule( ): |
|---|---|
| 2 | while n < N or not Walkers.Empty( ) do |
| 3 | while n < N and not Walkers.Full( ) do |
| 4 | Walkers.Insert(GenerateWalker(n++)); |
| 5 | foreach loaded block b do |
| 6 | PreSample(b); |
| 7 | If exists walkers can be moved then |
| 8 | MoveWalkers(Walkers); |

The scheduling process may start by checking to determine whether the number of generated walkers (e.g., lower letter n) has reached the total number (e.g., capital letter N) and whether the set of walkers is empty at line 2. If the number of walkers has not reached the total number N or the set of walkers is not empty (in case the number of generated walkers has reached N but there are still active walkers), the scheduling process may check to determine whether n has reached N and whether the set of walkers is full at line 3. If n is less than N and the set of generated walkers is not full, a new walker may be generated and inserted into the set of generated walkers (e.g., into the walker pool 116) at line 4. The new walker may be generated by invoking a function GenerateWalker, and the input parameter n may be an index for the walker to be generated, and the generated number of walkers may be incremented by one. The function GenerateWalker may be implemented in the walker generator 104.

Thereafter, at lines 5-6, the scheduling process may loop through each loaded graph block and generate pre-sampled edges for each vertex in each of the loaded graph block. Each loaded graph block may be processed by a function PreSample that may implement the operation to generate pre-sampled edges for each vertex in an input graph block. Then, at lines 7-8, the scheduling process may check to determine whether there are still walkers to move and move those walkers. Walkers may be moved by invoking a function MoveWalkers, which may be implemented in the walk engine 108.

In at least one embodiment, the PreSample function may be implemented in pseudo code as follows.

```
Function PreSample(Block block) :
    foreach v in block.vertices do
        While not PEbuffer[v.id ].Full( ) do
            PEbuffer[v.id ].Insert(Sample(v));
```

As shown in the pseudo code for the PreSample function, each vertex v of an input block's vertices may be processed by checking whether there is space in the pre-sampled edge buffer PEbuffer (e.g., buffer 118) for new edge to be inserted. Each vertex v may be identified by its index v.id. And if there is space (e.g., not full), the vertex v may be sampled by invoking a Sample function with the vertex v as an input and the generated pre-sampled edges may be inserted into the PEbuffer.

In at least one embodiment, the MoveWalkers function may be implemented in pseudo code as follows.

```
Function MoveWalkers(Walkers walkers [ ]) :
    foreach w in walkers do
        If PEbuffer[w.current].Empty( ) then continue;
        If not Active(w) then walkers.Remove(w);
        If Action(w, PEbuffer[w.current ].top( )) then
            PEbuffer[w.current ].pop( );
```

As shown in the pseudo code for the MoveWalkers function, each walker w in the set of walkers may be processed by checking whether there is at least one pre-sampled edge in the pre-sampled edge buffer PEbuffer for the walker (e.g., pre-sampled edges for w not empty in buffer 118). If there is no pre-sampled edge for this walker, the iteration may move on to the next walker. If there is at least one pre-sampled edge for this walker, then check to determine whether the walker is still active. If it is not active, remove the walker from the set of walkers. If it is still active, the walker is moved along the top edge of the list of edges for this walker in the buffer PEbuffer, then the top edge just used to move the walker may be marked as having been used (e.g., implemented in the pop operation).

The computing system 100 may provide several application programming interfaces (APIs) for users to implement random walk applications (e.g., for different computing tasks). For example, the pseudo code for the Schedule function, the PreSample function and the MoveWalkers function show that there may be four APIs to be called on. These four APIs may include GenerateWalker, Sample, Active and Action. GenerateWalker may be used to dynamically generate new walkers, which is similar to the initializing procedure of existing random walk computing systems. The Sample function may define how to sample an edge from the outgoing edges of a vertex, which may be any Sample function used in existing random walk systems or random walk systems developed in the future. The Sample function may describe the core logic of different random walk applications. It should note that pre-sample engine 106 may call the Sample function to pre-sample edges by iterating the vertices in a loaded block. Thus, the sampling logic is explicitly separated from the logic of using this sampling result.

The return value of Active function may indicate whether a walker is terminated. The walk engine 108 may call it before moving a walker. Finally, the Action function may be called by the walk engine 108, which may be used to implement the specific step moving logic of random walk. The Action function may return True to indicate that the pre-sampled edge passed in as the input is consumed. With the help of the pre-sampled edges in pre-sampling buffers, and Active and Action APIs, the walk engine 108 may be implemented by the decoupled walkers moving procedure MoveWalkers. The walk engine 108 may iterate walkers in the walker pool 116 and try to move them. As shown in the pseudo code for MoveWalkers, the walk engine 108 may check the remaining pre-sampled edges first (e.g., check whether PEbuffer[w.current] is empty) and get the next vertex from pre-sampled edges.

GenerateWalker, Sample, Active and Action APIs may be implemented according to specific computing tasks. As an example, an embodiment of the computing system 100 for performing weighted random walk may implement these four APIs using pseudo code as follows.

```
1      Function GenerateWalker(Int n) : Walker
2          return Walker{index: n, current: n, step: 0};
3      Function Sample(Vertex v) : VertexID
4          return WeightedSample(v.edges, v.edge_weights);
5      Function Active(Walker w) : Bool
6          return w.step < L;
7      Function Action(Walker w, VertexID next ) : Bool
8          w.current ←next ;
9          w.step++;
10         return True;
```

In a weighted graph, each edge has a weight property. A walker may start from a vertex with an overall walk length L. GenerateWalker may be called to generate the n-th walker that starts at the vertex whose ID is n. Sample may select an edge from all outgoing edges of the vertex v based on their weights. Active may evaluate whether a walker has walked L steps and returns Ture to indicate that the walker should be terminated based on whether the walker's step is equal to L. Action may move the walker w to the destination (next) of the pre-sampled edge. Each time a walker is moved, the walker's step will be incremented by one and the current vertex will be updated to the destination vertex.

As another example, Personalized Page Rank (PPR) has been proved to be an effective method of personalized ranking in many applications. It may be implemented as a random walk with restart (RWR) in a Markov chain. RWR is a variant of the simple random walk. There is a probability E that a walker restarts to its start vertex in each step. A Monte Carlo method that computes the PPR value of a queried vertex may be implemented as a RWR task. An embodiment of the computing system 100 for performing real-world random walk application of PPR may implement these four APIs using pseudo code as follows.

```
1      Function GenerateWalker(Int n) : Walker
2          idx ←n /WalkersPerQuery;
3          return Walker{index: idx, current: Q[idx ], step: 0};
4      Function Sample(Vertex v) : VertexID
5          return UniformSample(v.edges);
6      Function Active(Walker w) : Bool
7          visit [w.index ].Insert(w.current);
8          return w.step < L;
9      Function Action(Walker w, VertexID next ) : Bool
10         If Rand(1.0) < ε then
11             w.current ←Q[w.index ];
12             return False;
13         w.current ←next ;
14         w.step++;
15         return True;
```

PPR may issue a set of walkers starting from the queried vertex and record the times each vertex is visited by these walkers. The pseudo code may provide a multi-source PPR example that queries a set of vertices whose IDs are stored in Q. A number (WalkersPerQuery) of walkers for each queried vertex may be generated by defining the GenerateWalker function according to PPR computing task. The GenerateWalker function may be called |Q|×WalkersPerQuery times where |Q| is the size of Q and integer n may be passed in as the parameter of n-th calling. The Sample function may sample an edge from the outgoing edges of v uniformly. In addition to checking whether a walker should be terminated, the Active function may collect the visited vertices for each query. The Action function may be defined to implement the RWR task, which includes first determining whether the walker w should be restarted. If w restarts, the walker's current vertex may be set to the walker's start vertex. Otherwise, the walker may be moved like in the weighted random walk example.

In some embodiments, some techniques may be adopted by the computing system 100 to improve performance. For example, the pre-sampled edges may be the key resources that keep the walkers always moving. However, the memory 110 may have limited space to be allocated to the pre-sampled edge buffer 118. In some embodiments, the computing system 100 may also make use of the loaded edge data in the block buffer 120. Before any loaded block is evicted from memory, the computing system 100 may prioritize moving walkers on the block. Because the hottest block is always loaded in the computing system 100, a large number of walkers may be moved without consuming the pre-sampled edges retained in the pre-sampled edge buffers 118. As described above, one of the key advantages of pre-sampling is that its distribution is not limited by the block partitioning. With prioritizing movement on a loaded block, the pre-sampling results may be consumed only when the corresponding block is not in memory, which presumably avoids costly loading.

Another technique that may be used to improve performance of the computing system 100 may be adaptively adjustment of the sizes of a graph block for load operations. For example, in random walk applications, when there are plentiful active walkers, read throughput may be a bottleneck for conventional computing systems because most of the edge blocks will cover many active walkers. In these applications, when active walkers become sparse, there may be very few active walkers even in the hottest block. This reduces the efficiency of existing out-of-core random walk systems. In contrast, some embodiments of the computing system 100 may adaptively shrink the size of edge blocks according to the sparsity of walkers. As a result, the high input/output operations per second (IOPS) feature of modern disks (e.g., SSDs) may be leveraged and, at the same time, I/O utilization improved.

In some embodiments, the size of a graph block to be loaded into the memory 110 may be adjusted based on the number of active walkers. For example, in at least one embodiment, the number of active walkers currently on a block may be defined as the heat of the block. The computing system 100 may choose to work in a coarse-grained block mode or a fine-grained block mode depending whether there are any hot blocks. In the coarse-grained block mode, large size blocks (e.g., in the order of megabyte (MB) or gigabyte (GB)) may be loaded into the memory. In the fine-grained block mode, smaller blocks may be loaded into the memory. The block size of a fine-grained block, which may also be referred to as a mini-block, may be one or more orders of magnitude smaller than the coarse-grained blocks (e.g., in the order of KiB, such as but not limited to, 4 KiB). When there is at least one block that is hot enough, the coarse-grained block mode may be used in the computing system 100. In general, when a computing task is just started, there may be one or more hot blocks in the graph that are hot enough such that the system 100 may operate in the coarse-grained block mode.

In one embodiment, the total number of active walkers on the whole graph may be used to determine whether any block is hot enough such that the system 100 should in the coarse-grained block mode. For example, it has been observed that the hottest block usually has about twice as many walkers as the average. Therefore, when the total number of active walkers in the computing system 100 lowers to a threshold number (e.g., $\frac{1}{256}$ of the total edge number of the graph), even the hottest block is not hot enough and the computing system 100 may start to work in the fine-grained block mode. On the other hand, when the total number of active walkers in the computing system 100 is above the threshold number, the hottest block is hot enough and the computing system 100 may stay in the coarse-grained block mode. The coarse-grained block mode may continuously find the hottest unloaded coarse-grained block and load it into memory. As an example, using high-performance Linux-native asynchronous I/O access library on a Linux based computing system, a single thread may be enough to achieve the peak sequential read throughput of the SSD.

Because an edge takes up 4 bytes and the walkers are not evenly distributed, when the number of active walkers in the computing system 100 lowers to a certain number (e.g., $\frac{1}{256}$ of the total edge number of the graph), even for the hottest blocks, not all of the 4 KiB-grained blocks are required to move the walkers. Then, smaller sized blocks may be used to improve I/O utilization. That is, when the walkers become sparse enough, only a fraction of the data in a large block may be needed. In this situation, the computing system 100 may switch to the fine-grained block mode. In the fine-grained block mode, the computing system 100 may try to identify which fine-grained block should be loaded and launch accurate I/O request targeting these identified block(s).

In some embodiments, the underlying hardware of SSDs may set 4 KiB (an SSD page of 4096 bytes) as the smallest unit which can be read in one I/O operation. The computing system 100 may divide each coarse-grained block to multiple 4 KiB mini-blocks and issues I/O operations at the mini-block-granularity in fine-grained block mode. This may ensure that the high IOPS of SSDs can be fully utilized while bypassing the unrequired data as precisely as possible.

Figure 2A:
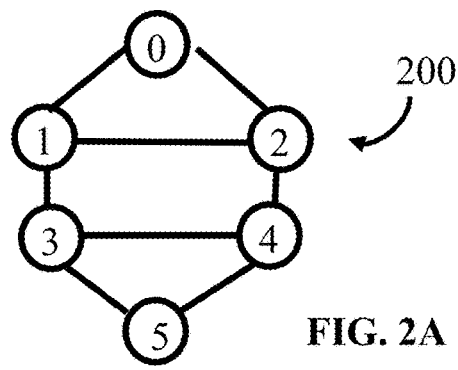
FIG. 2A schematically shows an adjacency list in one block in accordance with an embodiment of the present disclosure.
Figure 2B:
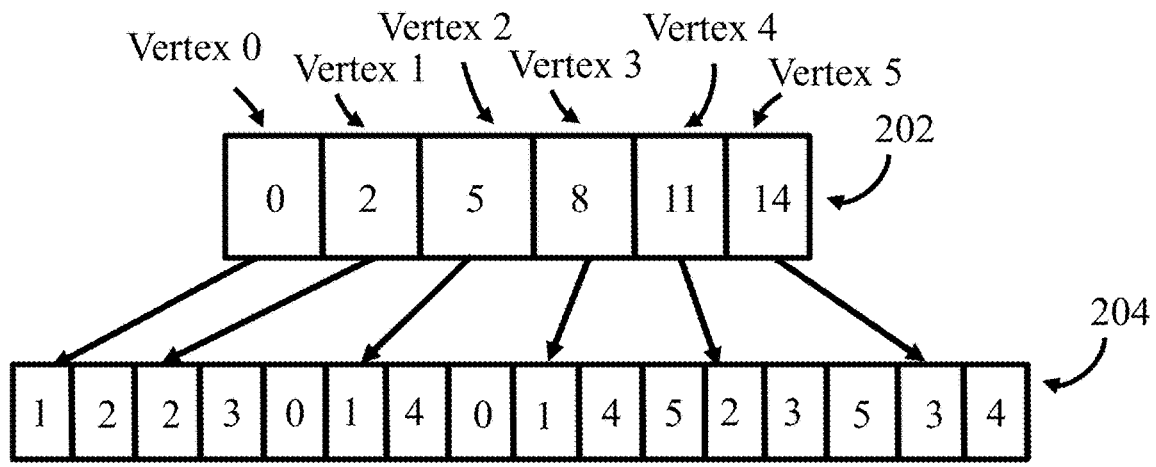
FIG. 2B schematically shows graph data for the graph block in FIG. 2A in accordance with an embodiment of the present disclosure.

FIG. 2A schematically shows a graph block 200 in accordance with an embodiment of the present disclosure. The graph block 200 shows an undirected graph that includes vertices 0, 1, 2, 3, 4 and 5 and edges between pairs of adjacent vertices. FIG. 2B schematically shows graph data for the graph block 200 in accordance with an embodiment of the present disclosure. Graph data may be stored in a compressed sparse row (CSR) format that includes vertex indices 202 and edge lists 204. Vertex indices 202 may store the position of the edge list for each vertex in the edge lists 204. For example, vertex 0 may have a vertex index of 0, which may point to the first entry in the edge lists 204. Because vertex 0 has two edges (e.g., one edge to vertex 1 and another edge to vertex 2), the edge list for vertex 0 may occupy two entries in the edge lists 204 with content of the entries being 1 and 2, representing the edges to vertex 1 and to vertex 2.

Vertex 1 may have a vertex index of 2, which may point to the third entry in the edge lists 204. Because vertex 1 has three edges, the edge list for vertex 0 may occupy three entries (e.g., 2, 3, and 0 for edges to vertices 2, 3 and 0, respectively). Vertex 2 may have a vertex index of 5 (e.g., point to the $6^{th}$ entry), vertex 3 may have a vertex index of 8, vertex 4 may have a vertex index of 11, and vertex 5 may have a vertex index of 14.

Figure 2C:
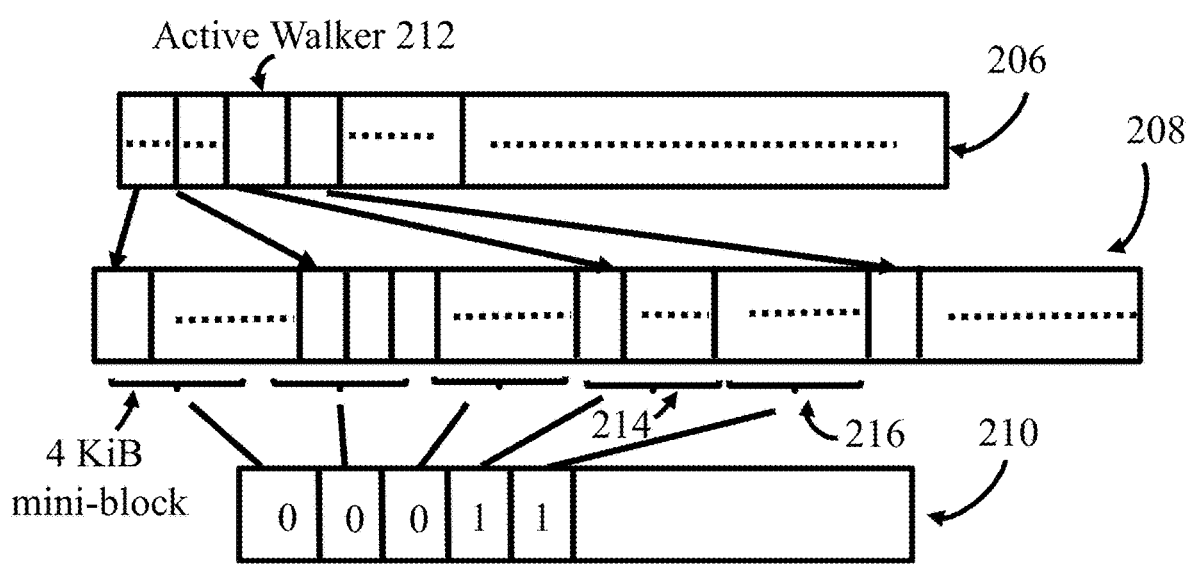
FIG. 2C schematically shows graph data for a graph in accordance with an embodiment of the present disclosure.

Vertex indices may be used to calculate the first and the last mini-blocks that a vertex's edges reside on. FIG. 2C shows graph data for a graph in accordance with an embodiment of the present disclosure. For the vertex indices 206, the edge lists 208 may contain many mini-blocks each with a 4 KiB size. A bitmap array 210 may be used to track with mini-blocks contain edges for a vertex that has an active walker. As an example, an active walker 212 may be on a vertex and the vertex index of the vertex may point to a starting position of the vertex's edges in the edge lists 208 and two mini-blocks 214 and 216 in the edge lists 208 may contain the edges for the vertex that has the active walker 212.

The vertex indices 206 may be loaded to into the memory 110 when the fine-grained block mode is turned on. In this situation, the walker pool 116, which may occupy the majority of memory 110 at the beginning, may have shrunk and some memory may be released. Thus, the computing system 100 may utilize the released memory space to accommodate the bitmap array 210 and the vertex indices 206. In at least one embodiment, the bitmap 210 may be used to indicate whether a mini-block should be loaded. For example, the bits being set (e.g., marked as "1") may indicate the corresponding mini-blocks 214 and 216 should be loaded. When the pre-sampled edges of a vertex are used up, the computing system 100 may mark the corresponding mini-blocks of the vertex so that these blocks will be loaded by I/O Engine 114 in the future. It should be noted that the edge lists 208 does not need to be kept in the memory in its whole. In the fine-grained mode, parts of the edge lists 208 may be loaded according to the bitmap.

Figure 3A:
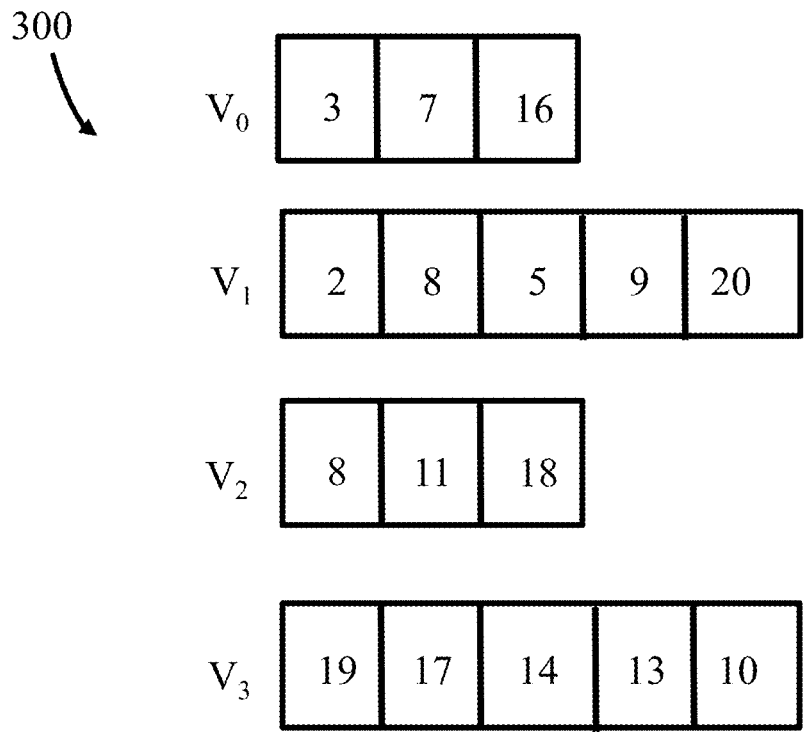
FIG. 3A schematically shows an adjacency list in one block in accordance with an embodiment of the present disclosure.

FIG. 3A schematically shows an adjacency list 300 in one block in accordance with an embodiment of the present disclosure. Vertices in the adjacency list of FIG. 3A may be zero-based (e.g., the index of the first vertex being zero). As shown in FIG. 3A, vertex $V_0$ may have edges to vertices 3, 16 and 7; vertex $V_1$ may have edges to vertices 2, 8, 5, 9, 20; vertex $V_2$ may have edges to vertices 3, 11 and 18; and vertex $V_3$ may have edges to vertices 19, 17, 14, 13 and 10. It should be noted that there is no requirement that the list of edges for a vertex are from low to high or high to low based on vertex numbers.

Figure 3B:
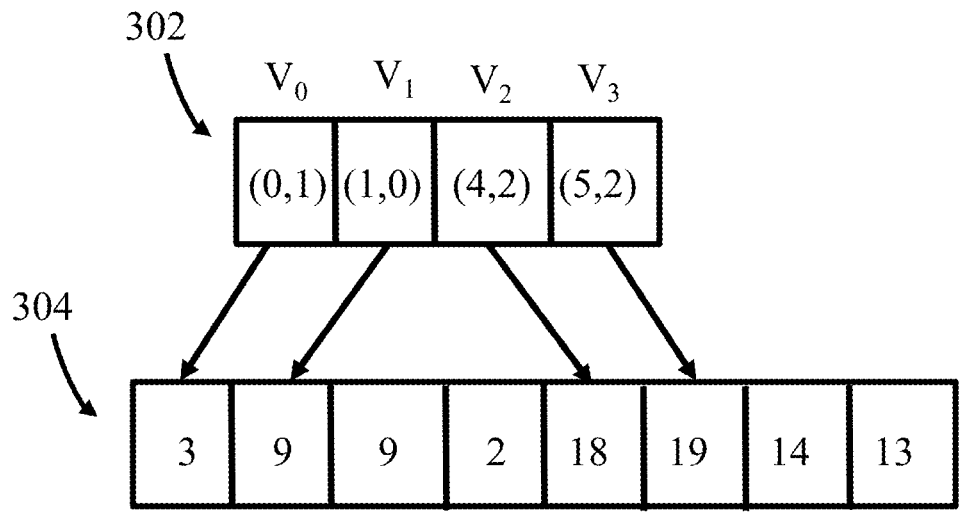
FIG. 3B schematically shows a data structure for a pre-sampled edge buffer in accordance with an embodiment of the present disclosure.

FIG. 3B schematically shows a data structure for a pre-sampled edge buffer for edges in the adjacency list of FIG. 3A in accordance with an embodiment of the present disclosure. In the decoupled architecture of the computing system 100, a walker may keep moving until pre-sampled edges of the corresponding vertex are used up. However, the total number of pre-sampled edges may be limited by memory space, which may be much smaller than total amount of graph data. Although initially, a pre-configured number of edges may be pre-sampled for each vertex in a loaded block, different vertices may be visited by different frequencies. Because the vertices may be visited unevenly by walkers, a compact data structure including a meta array 302 and an edges array 304 may support dynamically sampling more edges for the vertices visited more frequently. The visited frequencies are estimated by the historically visited frequencies. The compact data structure may be used in different random walk applications with different probability distributions.

In the computing system 100, a pre-sample edge buffer may store edges for a certain number of consecutive vertices. The pre-sampled edges of all vertices in the entire graph may be partitioned into multiple buffers. The data structure of a single buffer may include the meta array 302 and the edges array 304. Each vertex may have one or more pre-sampled edges and these edges may be continuously stored in the edges array 304. Each vertex may have a piece of metadata in the meta array 302. The piece of metadata for each vertex may be a tuple (idxv, cntv) that includes two fields referred to as, for example, idxv (indicating the position of pre-sampled edges) and cntv (counting the number of edges already consumed). For example, for vertex $V_0$, the tuple (0,1) may indicate that the starting position of pre-sample edges for this vertex is located at entry 0 of the edges array 304, and one edge (e.g., edge to vertex $V_3$ in entry 0) has already been consumed; for vertex $V_1$, the tuple (1,0) may indicate that the starting position of pre-sample edges for this vertex is located at entry 1 of the edges array 304, and no edge has been consumed (e.g., edges to vertices $V_9$, $V_9$, $V_2$ in entries 1, 2 and 3 available for moving walkers); for vertex $V_2$, the tuple (4,2) may indicate that the starting position of pre-sample edges for this vertex is located at entry 4 of the edges array 304, and one edge (e.g., edge to vertex 18 in entry 4) has been consumed twice; and for vertex $V_3$, the tuple (5,2) may indicate that the starting position of pre-sample edges for this vertex is located at entry 5 of the edges array 304, and two edges (e.g., edges to $V_{19}$, $V_{14}$, in entries 5 and 6 of the edges array 304) have already been consumed and one edge (e.g., edge to $V_{13}$) is available for moving a walker. In one embodiment, the piece of metadata may be 32-bit (e.g., 20 bits for idxv and 12 bits for cntv).

The metadata may be used to track the usage status of the pre-sampled edges and the visit history for each vertex. Each time before moving a walker, the walk engine 108 may check whether the pre-sampled edges are used up by checking whether idxv+cntv is less than next walker's idxv. The edge at position [idxv+cntv] in the edges array 304 may be the next pre-sampled edge that is used to move walker. And cntv may be incremented by one each time the corresponding vertex is visited (e.g., pop operation). When the pre-sample engine 106 is scheduled to refill the buffer, cntv is the historical visit frequency for the corresponding vertex. The pre-sample engine 106 may reallocate the number of edges sampled for each vertex based on each vertex's visit frequency. The limited buffer space may be used efficiently to reduce walker stalling.

In some embodiments, the features that support dynamically adjusting the number of pre-sampled edges for each vertex may also progressively increase the pre-sampled edge buffer 118 after more walkers are terminated. As more memory is allocated to the pre-sampled edge buffer 118, the size of the buffer may increase accordingly.

Figure 4:
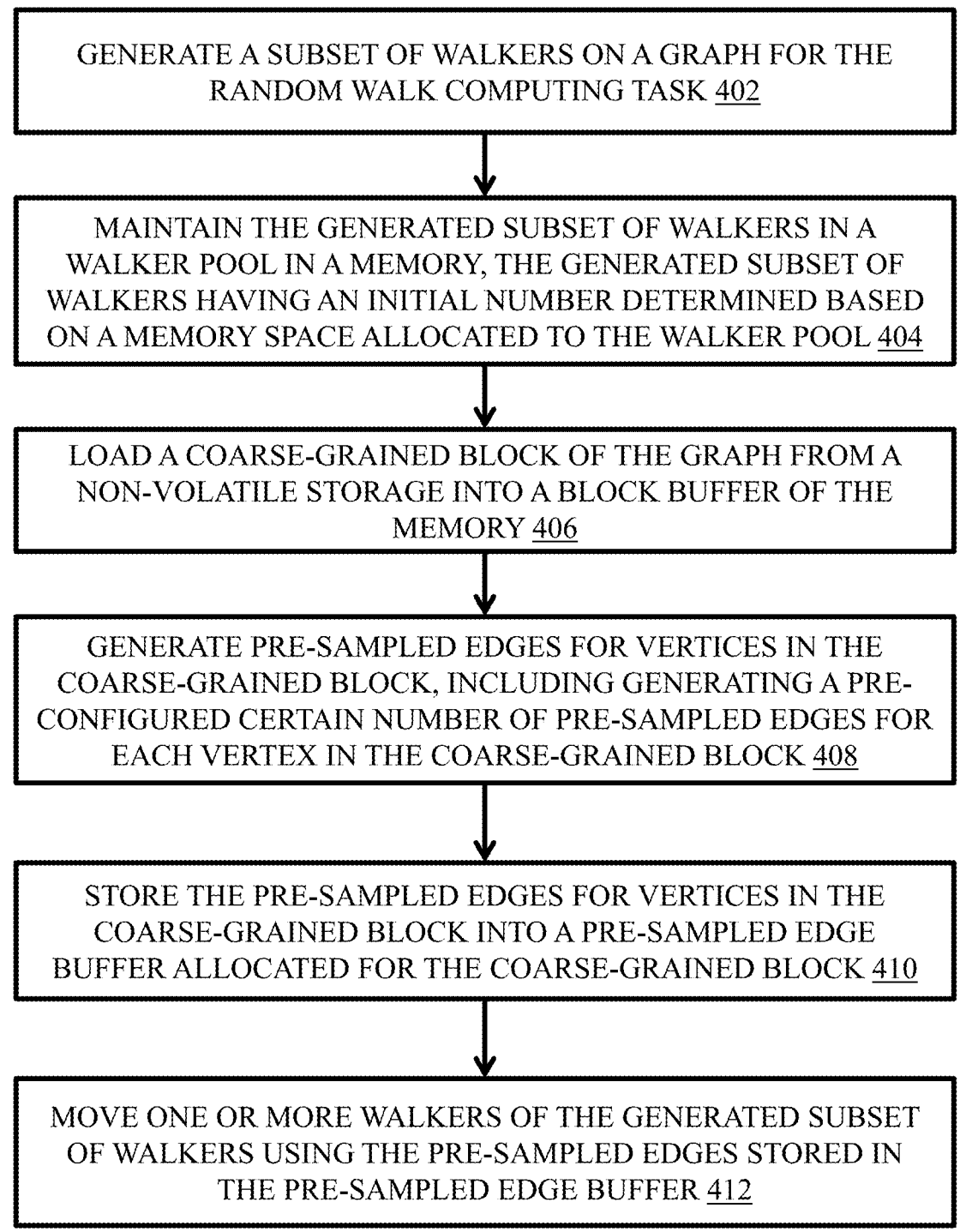
FIG. 4 schematically shows a flow diagram for performing out-of-core random walk computing in accordance with an embodiment of the present disclosure.

FIG. 4 shows a flow chart for a process 400 to perform a random walk computing task in accordance with an embodiment of the present disclosure. At block 402, a subset of walkers on a graph for the random walk computing task may be generated. The subset of walkers may be a portion of a full set of walkers on the graph. At block 404, the generated subset of walkers may be maintained in a walker pool in a memory. The generated subset of walkers may have an initial number determined based on a memory space allocated to the walker pool. As described herein, the computing system 100 may generate a portion of the walkers and hold them in memory during the computing operation. This may save the time for swapping walkers in and out of the memory and improve performance.

At block 406, a coarse-grained block of the graph may be loaded from a non-volatile storage (e.g., a hard drive such as an SSD) into a block buffer of the memory. The computing system 100 may operate in the coarse-grained block mode initially when there may be many active walkers, such that each block loaded into the memory may be large enough to facilitate movement of the active walkers. During operation, when the total number of active walkers in the computing system 100 is above the threshold number, the computing system 100 may stay in the coarse-grained block mode and continuously find the hottest unloaded coarse-grained block and load it into memory.

At block 408, pre-sampled edges for vertices in the coarse-grained block may be generated. In this process, a pre-configured certain number of pre-sampled edges for each vertex in the coarse-grained block may be generated. At block 410, the pre-sampled edges for vertices in the coarse-grained block may be stored into a pre-sampled edge buffer allocated for the coarse-grained block. At block 412, one or more walkers of the generated subset of walkers may be moved using the pre-sampled edges for vertices in the coarse-grained block stored in the pre-sampled edge buffer. The computing system 100 may be configured to generate pre-sampled edges for each vertex in each loaded coarse-grained block. These pre-sample edges may be stored in memory such that when a block is evicted, there are still stored pre-sampled edges to be used to move the walkers. This way, the computing system 100 may avoid stalling, which may be caused because the walkers have to wait for the blocks to be loaded.

Figure 5:
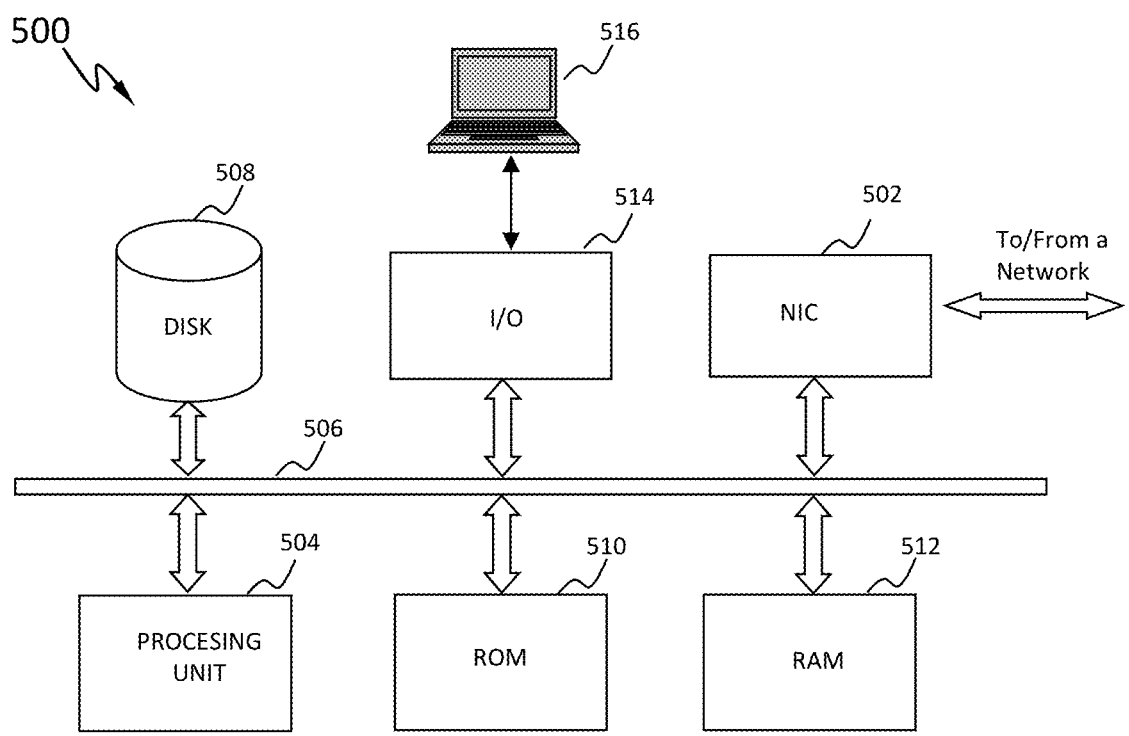
FIG. 5 shows a computing device configured to perform out-of-core random walk computing in accordance with an embodiment of the present disclosure.

FIG. 5 is a functional block diagram illustration for a computing device 500 on which the present teaching may be implemented. The computing device 500 may be a general-purpose computer or a special purpose computer or a blade in a rack of a data center, including but not limited to, a personal computer, a laptop, a server computer, a tablet, a smartphone. The methods and operations as described herein may each be implemented on one or more embodiments of the computing device 500, via hardware, software program, firmware, or a combination thereof.

The computing device 500, for example, may include one or more NICs 502 connected to and from a network to facilitate data communications. The computing device 500 may also include a processing unit 504. In an embodiment, the processing unit 504 may include a central processing unit (CPU), for example, in the form of one or more processors (e.g., single core or multi-core), for executing software instructions. In an embodiment, the CPU may be optional for the processing unit 504, but the processing unit 504 may comprise other processing units, for example, but not limited to, a Graphics Processing Unit (GPU), an ASIC, or one or more of both. It should be noted that the operations and processes described herein may be performed by a CPU, a GPU, an ASIC, other circuitry or combination of the processing units and circuitry.

The exemplary computer device 500 may further include an internal communication bus 506, program storage and data storage of different forms, e.g., an out-of-core storage such as the non-volatile storage 508 (e.g., conventional hard drive, or a solid state drive), read only memory (ROM) 510, and a main memory such as the random access memory (RAM) 512, for various data files to be processed and/or communicated by the computer, as well as software instructions to be executed by the CPU 504. The computing device 500 may also include an I/O component 514, supporting input/output flows between the computer and other components therein such as user interface elements 516 (which may be optional in a data center for a server machine). The computing device 500 may also receive software program and data via network communications.

In an exemplary embodiment, there is provided a method that may comprise: generating a subset of walkers on a graph for a random walk computing task, maintaining the generated subset of walkers in a walker pool in a memory, loading a coarse-grained block of the graph from a non-volatile storage into a block buffer of the memory, generating pre-sampled edges for vertices in the coarse-grained block that may include generating a pre-configured certain number of pre-sampled edges for each vertex in the coarse-grained block, storing the pre-sampled edges for vertices in the coarse-grained block into a pre-sampled edge buffer allocated for the coarse-grained block and moving one or more walkers of the generated subset of walkers using the pre-sampled edges stored in the pre-sampled edge buffer. The subset of walkers may be a portion of a full set of walkers on the graph and the generated subset of walkers may have an initial number determined based on a memory space allocated to the walker pool.

In an embodiment, the method may further comprise determining that a total number for active walkers in the graph lowers to a threshold number, and switching from a coarse-grained block mode to a fine-grained block mode with a fine-grained block being smaller than the coarse-grained block by at least an order of magnitude.

In an embodiment, graph data for the graph may be stored in a compressed sparse row (CSR) format that includes vertex indices and edge lists, each vertex index of the vertex indices storing a starting position of an edge list in the edge lists for a respective vertex.

In an embodiment, the method may further comprise maintaining a bitmap array in the memory in the fine-grained block mode. The bitmap array may include bits being set to indicate which fine-grained blocks contain edges for vertices that have active walkers and should be loaded.

In an embodiment, the pre-sampled edge buffer may contain a meta array and an edges array. Each entry of the meta array may be a piece of metadata in a tuple (field one, field two) with field one indicating a starting position of pre-sampled edges for a vertex and field two counting a number of edges already consumed by walkers moving from the vertex.

In an embodiment, during operation, each vertex may start to have its own respective number of pre-sampled edges based on frequency of visits counted by its field two.

In an embodiment, the method may further comprise using edges in a loaded block as pre-sampled edges to move walkers before evicting the load block.

In an embodiment, the method may further comprise generating new walkers instead of moving existing walkers after one or more walkers terminate for faster consumption of the pre-sampled edges in the pre-sampled edge buffer.

In another exemplary embodiment, there is provided a computing system that may comprise a main memory for storing software instructions for performing random walk graph computing and a central processing unit (CPU) coupled to the main memory and configured to execute the software instructions to: generate a subset of walkers on a graph for a random walk computing task, maintain the generated subset of walkers in a walker pool in a memory, load a coarse-grained block of the graph from a non-volatile storage into a block buffer of the memory, generate pre-sampled edges for vertices in the coarse-grained block that may include generating a pre-configured certain number of pre-sampled edges for each vertex in the coarse-grained block, store the pre-sampled edges for vertices in the coarse-grained block into a pre-sampled edge buffer allocated for the coarse-grained block and move one or more walkers of the generated subset of walkers using the pre-sampled edges stored in the pre-sampled edge buffer. The subset of walkers may be a portion of a full set of walkers on the graph. The generated subset of walkers may have an initial number determined based on a memory space allocated to the walker pool.

In an embodiment, the CPU executing the software instructions may be further configured to: determine that a total number for active walkers in the graph lowers to a threshold number and switch from a coarse-grained block mode to a fine-grained block mode with a fine-grained block being smaller than the coarse-grained block by at least an order of magnitude.

In an embodiment, graph data for the graph may be stored in a compressed sparse row (CSR) format that includes vertex indices and edge lists, each vertex index of the vertex indices storing a starting position of an edge list in the edge lists for a respective vertex.

In an embodiment, the CPU executing the software instructions may be further configured to maintain a bitmap array in the memory in the fine-grained block mode. The bitmap array may include bits being set to indicate which fine-grained blocks contain edges for vertices that have active walkers and should be loaded.

In an embodiment, the pre-sampled edge buffer may contain a meta array and an edges array. Each entry of the meta array may be a piece of metadata in a tuple (field one, field two) with field one indicating a starting position of pre-sampled edges for a vertex and field two counting a number of edges already consumed by walkers moving from the vertex.

In an embodiment, during operation, each vertex may start to have its own respective number of pre-sampled edges based on frequency of visits counted by its field two.

In an embodiment, the CPU executing the software instructions may be further configured to using edges in a loaded block as pre-sampled edges to move walkers before evicting the load block.

In an embodiment, the CPU executing the software instructions may be further configured to generate new walkers instead of moving existing walkers after one or more walkers terminate for faster consumption of the pre-sampled edges in the pre-sampled edge buffer.

In yet another exemplary embodiment, there is provided one or more computer-readable non-transitory media comprising one or more software instructions that when executed by one or more processors are to configure the one or more processors to cause performance of random walk graph computing operations comprising: generating a subset of walkers on a graph for a random walk computing task, the subset of walkers being a portion of a full set of walkers on the graph; maintaining the generated subset of walkers in a walker pool in a memory, the generated subset of walkers having an initial number determined based on a memory space allocated to the walker pool; loading a coarse-grained block of the graph from a non-volatile storage into a block buffer of the memory; generating pre-sampled edges for vertices in the coarse-grained block, including generating a pre-configured certain number of pre-sampled edges for each vertex in the coarse-grained block; storing the pre-sampled edges for vertices in the coarse-grained block into a pre-sampled edge buffer allocated for the coarse-grained block; and moving one or more walkers of the generated subset of walkers using the pre-sampled edges stored in the pre-sampled edge buffer.

In an embodiment, the one or more software instructions when executed by the one or more processors may be to further configure the one or more processors to cause further performance of random walk graph computing operations comprising: determining that a total number for active walkers in the graph lowers to a threshold number; switching from a coarse-grained block mode to a fine-grained block mode with a fine-grained block being smaller than the coarse-grained block by at least an order of magnitude, wherein graph data for the graph is stored in a compressed sparse row (CSR) format that includes vertex indices and edge lists, each vertex index of the vertex indices storing a starting position of an edge list in the edge lists for a respective vertex; and maintaining a bitmap array in the memory in the fine-grained block mode, the bitmap array including bits being set to indicate which fine-grained blocks contain edges for vertices that have active walkers and should be loaded.

In an embodiment, the pre-sampled edge buffer may contain a meta array and an edges array. Each entry of the meta array may be a piece of metadata in a tuple (field one, field two) with field one indicating a starting position of pre-sampled edges for a vertex and field two counting a number of edges already consumed by walkers moving from the vertex. During operation, each vertex may start to have its own respective number of pre-sampled edges based on frequency of visits counted by its field two.

In an embodiment, the one or more software instructions when executed by the one or more processors may be to further configure the one or more processors to cause further performance of random walk graph computing operations comprising: using edges in a loaded block as pre-sampled edges to move walkers before evicting the load block; and generating new walkers instead of moving existing walkers after one or more walkers terminate for faster consumption of the pre-sampled edges in the pre-sampled edge buffer.

Hence, aspects of the system and method for random walk graph computing, as outlined above, may be embodied in programming (e.g., software instructions). Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. For example, although the implementation of various components described above may be embodied in a hardware device, it can also be implemented as a firmware, firmware/software combination, firmware/hardware combination, or a hardware/firmware/software combination. The presently disclosed embodiments are therefore to be considered in all respects as illustrative and not restrictive, the scope of the present teaching being indicated by the following claims and their legal equivalents, and not limited to the foregoing description.

What is claimed is:

1. A method for performing a random walk computing task, comprising:
   generating a subset of walkers on a graph for the random walk computing task, the subset of walkers being a portion of a full set of walkers on the graph;
   maintaining the generated subset of walkers in a walker pool in a memory, the generated subset of walkers having an initial number determined based on a memory space allocated to the walker pool;
   loading a coarse-grained block of the graph from a non-volatile storage into a block buffer of the memory;
   generating pre-sampled edges for vertices in the coarse-grained block, including generating a pre-configured certain number of pre-sampled edges for each vertex in the coarse-grained block;
   storing the pre-sampled edges for vertices in the coarse-grained block into a pre-sampled edge buffer allocated for the coarse-grained block; and
   moving one or more walkers of the generated subset of walkers using the pre-sampled edges stored in the pre-sampled edge buffer.

2. The method of claim 1, further comprising:
   determining that a total number for active walkers in the graph lowers to a threshold number; and
   switching from a coarse-grained block mode to a fine-grained block mode with a fine-grained block being smaller than the coarse-grained block by at least an order of magnitude.

3. The method of claim 2, wherein graph data for the graph is stored in a compressed sparse row (CSR) format that includes vertex indices and edge lists, each vertex index of the vertex indices storing a starting position of an edge list in the edge lists for a respective vertex.

4. The method of claim 3, further comprising maintaining a bitmap array in the memory in the fine-grained block mode, the bitmap array including bits being set to indicate which fine-grained blocks contain edges for vertices that have active walkers and should be loaded.

5. The method of claim 1, wherein the pre-sampled edge buffer contains a meta array and an edges array, each entry of the meta array is a piece of metadata in a tuple (field one, field two) with field one indicating a starting position of pre-sampled edges for a vertex and field two counting a number of edges already consumed by walkers moving from the vertex.

6. The method of claim 5, wherein during operation, each vertex starts to have its own respective number of pre-sampled edges based on frequency of visits counted by its field two.

7. The method of claim 1, further comprising using edges in a loaded block as pre-sampled edges to move walkers before evicting the load block.

8. The method of claim 1, further comprising generating new walkers instead of moving existing walkers after one or more walkers terminate for faster consumption of the pre-sampled edges in the pre-sampled edge buffer.

9. A computing system, comprising:
   a main memory for storing software instructions for performing random walk graph computing; and
   a central processing unit (CPU) coupled to the main memory and configured to execute the software instructions to:
      generate a subset of walkers on a graph for a random walk computing task, the subset of walkers being a portion of a full set of walkers on the graph;
      maintain the generated subset of walkers in a walker pool in a memory, the generated subset of walkers having an initial number determined based on a memory space allocated to the walker pool;
      load a coarse-grained block of the graph from a non-volatile storage into a block buffer of the memory;
      generate pre-sampled edges for vertices in the coarse-grained block, including generating a pre-configured certain number of pre-sampled edges for each vertex in the coarse-grained block;
      store the pre-sampled edges for vertices in the coarse-grained block into a pre-sampled edge buffer allocated for the coarse-grained block; and
      move one or more walkers of the generated subset of walkers using the pre-sampled edges stored in the pre-sampled edge buffer.

10. The computing system of claim 9, wherein the CPU executing the software instructions is further configured to:
    determine that a total number for active walkers in the graph lowers to a threshold number; and
    switch from a coarse-grained block mode to a fine-grained block mode with a fine-grained block being smaller than the coarse-grained block by at least an order of magnitude.

11. The computing system of claim 10, wherein graph data for the graph is stored in a compressed sparse row (CSR) format that includes vertex indices and edge lists, each vertex index of the vertex indices storing a starting position of an edge list in the edge lists for a respective vertex.

12. The computing system of claim 11, wherein the CPU executing the software instructions is further configured to maintain a bitmap array in the memory in the fine-grained block mode, the bitmap array including bits being set to indicate which fine-grained blocks contain edges for vertices that have active walkers and should be loaded.

13. The computing system of claim 9, wherein the pre-sampled edge buffer contains a meta array and an edges array, each entry of the meta array is a piece of metadata in a tuple (field one, field two) with field one indicating a starting position of pre-sampled edges for a vertex and field two counting a number of edges already consumed by walkers moving from the vertex.

14. The computing system of claim 13, wherein during operation, each vertex starts to have its own respective number of pre-sampled edges based on frequency of visits counted by its field two.

15. The computing system of claim 9, wherein the CPU executing the software instructions is further configured to using edges in a loaded block as pre-sampled edges to move walkers before evicting the load block.

16. The computing system of claim 9, wherein the CPU executing the software instructions is further configured to generate new walkers instead of moving existing walkers after one or more walkers terminate for faster consumption of the pre-sampled edges in the pre-sampled edge buffer.

17. One or more computer-readable non-transitory media comprising one or more software instructions that when executed by one or more processors are to configure the one or more processors to cause performance of random walk graph computing operations comprising:
- generating a subset of walkers on a graph for a random walk computing task, the subset of walkers being a portion of a full set of walkers on the graph;
- maintaining the generated subset of walkers in a walker pool in a memory, the generated subset of walkers having an initial number determined based on a memory space allocated to the walker pool;
- loading a coarse-grained block of the graph from a non-volatile storage into a block buffer of the memory;
- generating pre-sampled edges for vertices in the coarse-grained block, including generating a pre-configured certain number of pre-sampled edges for each vertex in the coarse-grained block;
- storing the pre-sampled edges for vertices in the coarse-grained block into a pre-sampled edge buffer allocated for the coarse-grained block; and
- moving one or more walkers of the generated subset of walkers using the pre-sampled edges stored in the pre-sampled edge buffer.

18. The computer-readable non-transitory media of claim 17, wherein the one or more software instructions when executed by the one or more processors are to further configure the one or more processors to cause further performance of random walk graph computing operations comprising:
- determining that a total number for active walkers in the graph lowers to a threshold number;
- switching from a coarse-grained block mode to a fine-grained block mode with a fine-grained block being smaller than the coarse-grained block by at least an order of magnitude, wherein graph data for the graph is stored in a compressed sparse row (CSR) format that includes vertex indices and edge lists, each vertex index of the vertex indices storing a starting position of an edge list in the edge lists for a respective vertex; and
- maintaining a bitmap array in the memory in the fine-grained block mode, the bitmap array including bits being set to indicate which fine-grained blocks contain edges for vertices that have active walkers and should be loaded.

19. The computer-readable non-transitory media of claim 17, wherein the pre-sampled edge buffer contains a meta array and an edges array, each entry of the meta array is a piece of metadata in a tuple (field one, field two) with field one indicating a starting position of pre-sampled edges for a vertex and field two counting a number of edges already consumed by walkers moving from the vertex, and wherein during operation, each vertex starts to have its own respective number of pre-sampled edges based on frequency of visits counted by its field two.

20. The computer-readable non-transitory media of claim 17, wherein the one or more software instructions when executed by the one or more processors is to further configure the one or more processors to cause further performance of random walk graph computing operations comprising:
- using edges in a loaded block as pre-sampled edges to move walkers before evicting the load block; and
- generating new walkers instead of moving existing walkers after one or more walkers terminate for faster consumption of the pre-sampled edges in the pre-sampled edge buffer.

* * * * *